United States Patent [19]

Meyer et al.

[11] Patent Number: 5,118,434

[45] Date of Patent: Jun. 2, 1992

[54] DEICING FLUIDS

[75] Inventors: Gene R. Meyer; Donald C. Smith, both of Midland, Mich.

[73] Assignee: The Dow Chemical Company, Midland, Mich.

[21] Appl. No.: 661,778

[22] Filed: Feb. 26, 1991

[51] Int. Cl.$^5$ ................................................ C09K 3/18
[52] U.S. Cl. .................................... 252/70; 252/73; 252/75; 252/76; 252/78.1; 252/79; 252/180; 210/701; 524/376; 524/378; 526/287; 526/318.42
[58] Field of Search ....................... 252/70, 73, 75, 76, 252/78.1, 79, 180, 181; 210/698, 701; 524/376, 378; 526/287, 318.42

[56] References Cited

U.S. PATENT DOCUMENTS

| | | | |
|---|---|---|---|
| 2,802,788 | 8/1957 | Flaxman | 252/181 |
| 3,928,196 | 12/1975 | Persinski et al. | 210/58 |
| 3,948,792 | 4/1976 | Watson et al. | 252/181 |
| 3,962,109 | 6/1976 | Oberhofer et al. | 252/74 |
| 4,029,577 | 6/1977 | Godlewski et al. | 210/58 |
| 4,711,735 | 12/1987 | Gulley | 252/76 |
| 4,828,795 | 5/1989 | Cook et al. | 252/180 |
| 4,952,327 | 8/1990 | Amjad et al. | 252/180 |

*Primary Examiner*—Paul Lieberman
*Assistant Examiner*—Christine A. Skane

[57] ABSTRACT

Precipitation of salts from glycol-based fluids when mixed with water is prevented by the addition of copolymers or terpolymers of acrylic acid or alkali metal salt thereof and one or more of the monomers selected from the group consisting of 2-acrylamido-2-methylpropyl sulfonic acid or metal salt thereof, 4-styrenesulfonic acid or metal salt thereof, a lower alkyl hydroxy acrylate, and mixtures thereof.

24 Claims, No Drawings

DEICING FLUIDS

BACKGROUND OF THE INVENTION

This invention relates to glycol-based compositions useful as antifreeze fluids in heat-transfer applications or as deicing fluids for aircraft.

Glycol-based fluids are commonly employed as in heat-transfer fluids and as deicing fluids for aircraft. The formulations are typically based on alkylene glycols such as ethylene and propylene glycol. Since it is known that metal surfaces sometimes corrode when contacted with fluids of water and glycol, a wide assortment of corrosion inhibitors are often added to alleviate this side effect. A problem exists, however, because when water is used to dilute concentrated glycol-based fluids, cations such as calcium and magnesium ions from the water form precipitates with various anions from additives to the glycol-based fluid. When this happens, the diluted mixture becomes turbid. This effect is undesirable and both the United States and Canada will soon require aircraft deicing fluids to remain clear on contact with water.

Aircraft deicing fluids are known which incorporate viscous homopolymers and copolymers of acrylic acid, methacrylic acid, or maleic acid, or cross-linked polymers thereof, to thicken the fluids. The thickened fluids coat the aircraft and, thus, prevent the buildup of ice. Such compositions are disclosed, for example, in U.S. Pat. Nos. 3,940,356: 4,358,389: and 4,744,913.

It can be seen that the prior art lacks a way of preventing the precipitation of salts from glycol-based compositions when the compositions are admixed with water, especially hard water. A solution to this problem would be of benefit to the public as well as to the users and manufacturers of these glycol-based fluids.

SUMMARY OF THE INVENTION

It has now been found that the addition of a small but effective amount of certain polymeric additives to glycol-based compositions inhibits the precipitation of salts which cause turbidity of the compositions when admixed with water. It is surprising that precipitation is prevented in the alkaline glycol-based compositions of the present invention since the alkaline conditions increase precipitation of salts in solution. More surprisingly, precipitation is inhibited despite the presence of corrosion inhibitors in concentrations in excess of about 10,000 parts per million. It is critical that the polymeric additives are not only dispersable in concentrated glycol solutions, but remain dispersed for many months so as to have good shelf life.

In one respect, the present invention is a composition which comprises:

(A) 50 to 99 percent by weight of one or more glycols, the glycols comprising alkylene glycols, alkylene glycol monoethers, and alkylene glycol diethers;

(B) 0.001 to 15 percent by weight of one or more corrosion inhibitors:

(C) 25 to 2500 parts of a polymeric additive per million parts by weight of the one or more glycols, the polymeric additive being essentially free of cross-linking and being a copolymer or terpolymer of acrylic acid or alkali metal salt thereof and one or more of the monomers selected from the group consisting of 2-acrylamido-2-methylpropyl sulfonic acid or alkali metal salt thereof, 4-styrenesulfonic acid or alkali metal salt thereof, a lower alkyl hydroxy acrylate, and mixtures thereof: and (D) optionally up to 50 percent by weight of water In another respect, the present invention is a method which comprises admixing a glycol-based composition with water to form a mixture containing between about 15 and 85 percent by weight water, said glycol-based composition comprising: (A) 50 to 99 percent by weight of one or more glycols, the glycols comprising alkylene glycols, alkylene glycol monoethers, and alkylene glycol diethers: (B) 0.001 to 15 percent by weight of one or more corrosion inhibitors: (C) 25 to 2500 parts of a polymeric additive per million parts by weight of the one or more glycols, the polymeric additive being essentially free of cross-linking and being a copolymer or terpolymer of acrylic acid or alkali metal salt thereof and one or more of the monomers selected from the group consisting of 2-acrylamido-2-methylpropyl sulfonic acid or metal salt thereof, 4-styrenesulfonic acid or metal salt thereof; and (D) optionally up to 50 percent by weight of water.

In still another respect, the present invention is a method for inhibiting the precipitation of salts in glycol-based compositions when contacted with water which comprises adding about 25 to 2500 parts of a polymeric additive per million parts by weight of glycol prior to contacting the glycol-based composition with water, the polymeric additive being essentially free of cross-linking and being a copolymer or terpolymer of acrylic acid or alkali metal salt thereof and one or more of the monomers selected from the group consisting of 2-acrylamido-2-methylpropyl sulfonic acid or metal salt thereof, 4-styrenesulfonic acid or metal salt thereof, a lower alkyl hydroxy acrylate, and mixtures thereof.

DETAILED DESCRIPTION OF THE INVENTION

The present invention is a composition based on alkylene glycols, water, corrosion inhibitors, and one or more polymeric additives, and a method of use thereof. The compositions have a pH above 7.5.

The glycols which can be used in the present invention comprise: (1) alkylene glycols such as ethylene glycol, diethylene glycol, propylene glycol, dipropylene, and triethylene glycol; (2) alkylene glycol monoethers such as the methyl, ethyl, propyl, and butyl ethers of ethylene glycol, diethylene glycol, propylene glycol, dipropylene glycol, and triethylene glycol; (3) alkylene glycol diethers such as the methyl and ethyl diethers of ethylene glycol, diethylene glycol, and dipropylene glycol; and (4) mixtures thereof. Preferred glycols are ethylene glycol, diethylene glycol, propylene glycol, triethylene glycol, and mixtures thereof.

Preferably, the glycols comprise from about 50 to 99 percent by weight of the composition, more preferably between about 90 and 98 percent by weight.

The amount of water in the composition may be up to 50 percent by weight of the composition. Preferably, the amount of water is between about 1 and 10 percent by weight.

The following are examples of known corrosion inhibitors for use in glycol-based compositions which prevent the corrosion of metals such as aluminum, cadmium, copper, iron, magnesium, and alloys thereof: alkali metal silicates or polysilicates such as sodium metasilicate, potassium metasilicate, lithium metasilicate, and the like; alkali metal borates such as sodium tetraborate, potassium tetraborate, sodium metaborate, and potassium metaborate; alkali metal mercaptobenzothiazoles, and alkali metal tolyltriazoles such as sodium tolyltriazole and benzotriazole; alkali metal nitrates such as sodium nitrate, potassium nitrate, and alkali metal nitrites such as potassium and sodium nitrite; alkali metal phosphates such as sodium phosphate, potassium phosphate, dipotassium phosphate, disodium phosphate; phosphonic acid; sodium and potassium salts of carbonates; alkali metal benzoates: and alkali metal molybdates such as sodium molybdate.

The use of the above corrosion inhibitors when used in a corrosion inhibiting amount is well known in the prior art. One or more of the above corrosion inhibitors may be used in a particular formulation depending on the end use. Particular combinations of corrosion inhibitors for specific purposes are known to those skilled in the art. The amount of the one or more corrosion inhibitors should be less than 20 percent by weight. Preferably, the amount of the one or more corrosion inhibitors is between about 0.001 and 15 percent by weight of the composition, more preferably between 0.01 and 10 percent by weight.

Several polymeric materials, described below, were found to prevent the precipitation of iron, zinc, calcium, and magnesium salts of phosphate, biphosphate, sulphate, oxolate, carbonate, bicarbonate, silicate, polysilicate, and the like, in glycol-based compositions when contacted with water. The polymeric additives of the present invention are essentially free of crosslinking. Cross-linking is defined in *Hawley's Condensed Chemical Dictionary*, 323 (Sax and Lewis rev. 11th ed. 1987) as the attachment of two chains of polymer molecules by bridges composed of either an element, a group, or a compound which join certain carbon atoms of the chains by primary chemical bonds. Divinylbenzene is a typical cross-linking agent. Depending upon reaction conditions and amount of cross-linking agent added, many polymer chains can be linked together to form very large molecules.

One useful polymeric additive is a copolymer of acrylic acid or alkali metal salt thereof and 2-acrylamido-2-methylpropyl sulfonic acid or alkali metal salt thereof. These copolymers may have a molecular weight of from about 100 to 10,000 and may contain from about 5 to 75 mole percent 2-acrylamido-2-methylpropyl sulfonic acid or alkali metal salt thereof and from about 25 to 95 mole percent acrylic acid or alkali metal salt thereof. The viscosity of this copolymer is preferably between about 10 and 250 centistokes when measured at 25° C. as a 1% aqueous solution, more preferably between about 50 and 150 centistokes. Methods of making these polymeric materials are known to those skilled in the art.

Another suitable polymeric additive is a terpolymer of acrylic acid or alkali metal salt thereof, 2-acrylamido-2-methylpropyl sulfonic acid or metal salt thereof, and 4-styrenesulfonic acid or metal salt thereof. B. F. Goodrich sells such terpolymers commercially under the trademark, "GoodRite ® K-700." The composition of the terpolymer is between about 5 to 95 parts acrylic acid or alkali metal salt thereof, 5 to 95 parts 2-acrylamido-2-methylpropyl sulfonic acid or alkali metal salt thereof, and 1 to 50 parts 4-styrenesulfonic acid or alkali metal salt thereof. The viscosity of the terpolymer is less than about 1500 centistokes when measured at 25° C. as a 1% aqueous solution.

In addition, still another polymeric additive useful in the present invention is an acrylic acid and lower alkyl hydroxy acrylate copolymer which may be represented by the formula:

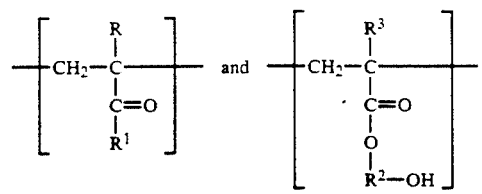

where R is hydrogen or a lower alkyl of from 1 to 3 carbon atoms; $R^1$ is OH, OM, NH2, where M is a water soluble cation, e.g., NH4, alkali metal (K, and Na), etc: $R^2$ is a lower alkyl having from about 2 to 6 carbon atoms (the OH substituent may be attached to any of the C atoms in the alkyl group) and $R^3$ is H or a lower alkyl of from 1 to 3 carbon atoms.

The acrylic acid derived moiety (AA) and the lower alkyl hydroxy acrylate derived moiety (AHA) of the copolymer most advantageously have a mole ratio of AA to AHA of from about 35:1 to about 1:4, and preferably 110:1 to 1:2 The copolymer has a molecular weight of from 1,000 to 500,000, preferably about 10,000. In addition, the viscosity of this copolymer is preferably between about 400 to 900 centistokes when measured at 25° C. as a 1% aqueous solution.

A preferred copolymer of AA and AHA is one of the formula:

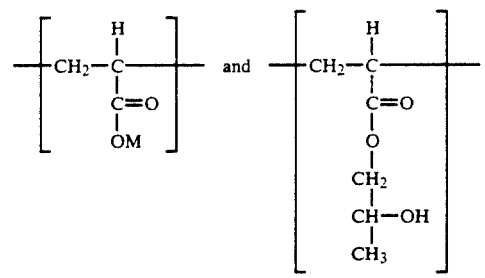

wherein M is as defined previously. In this preferred copolymer, the AHA is 2-hydroxy-propyl-acrylate.

The minimum amount of a polymeric additive required to prevent precipitation of salts from a given glycol-based composition will vary dependent on several factors such as the hardness of the water used to dilute the glycol-based fluids, concentration of precipitable anions, desired level of precipitation retardation, pH, temperature, and the like. Preferably, the amount of polymeric additive is from about 25 to 2500 parts per million parts glycol by weight, more preferably from about 325 to 1500. Most preferably, the amount of polymeric additive is from about 375 to 1250 parts per million parts glycol by weight.

Satisfactory results have been realized when the polymeric additives were added to glycol-based compositions having a pH value in the range from about 7.5 to 12. Preferably, the pH of the glycol-based composition is from about 8.0 to 10.

When used as a deicing fluid for aircraft, the glycol-based compositions of this invention may be used by spraying with conventional equipment onto the surfaces to be treated. In practice, whether used as a deicing fluid or as a heat-transfer fluid, the glycol-based compositions of the present invention are diluted with water. Although typically employed as a glycol-water mixture diluted to between about 30 and 50 percent glycol by weight, the compositions of the present invention can be diluted as low as 15 percent glycol.

Additionally, the glycol-based compositions of the present invention may comprise other additives such as dyes, wetting agents such as sodium dioctyl sulfosuccinate or its equivalent, and anti-foam agents such as polyglycols. These additional additives may be used in amounts between about 0.001 and 5 percent by weight of the glycol-based compositions.

The compositions of the present invention were subjected to a variety of tests to determine whether they conformed to the requirements set out in the publication AMS 1425B which is established by the Society of Automotive Engineers ("SAE").

SPECIFIC EMBODIMENTS OF THE INVENTION

The following examples are given to illustrate the invention and should not be construed as limiting its scope. All parts and percentages are by weight unless otherwise indicated.

EXAMPLE 1

Mix 175 milliliter ("ml") ethylene glycol mixture containing 2 percent potassium phosphate dibasic and 0.5 percent sodium tolyltriazole and 175 ml of SAE standard hard water in a 500 ml jar equipped with a screw cap and polyethylene sealing. The admixed glycol-water solution contains about 10,500 parts per million by weight of phosphate ion. One liter of SAE standard hard water contains about 400 mg of Ca(CH$_3$CO$_2$)$_2$.2H$_2$O and about 280 mg MgSO$_4$.7H$_2$O in deionized water and, therefore, the glycol-water solution has about 39 parts per million by weight of Ca$^{+2}$ ion and 13 parts per million by weight of Mg$^{+2}$ ion. To the jar is further added a copolymer of acrylic acid and the sodium salt of 2-acrylamido-2-methylpropyl sulfonic acid having an average molecular weight of 4500 and a viscosity of 100 centistokes as a 1% solution at 25° C. in an amount of about 280 parts per million by weight of the total solution. Place the jar, well closed, in a heated chamber maintained at 95° C.±2° C. for 30 days. After removing and cooling down the fluid, examine visually and compare with a non-aged control fluid. Precipitation is inhibited when the clarity of the solution is about equal to that of a control jar containing glycol, polymeric additive, and deionized water which has not been placed in the heat bath. The pH must be maintained within half a unit to pass the test. In this example, precipitation is inhibited.

EXAMPLE 2

The procedure of Example 1 is repeated except that the additive is added in an amount equal to about parts per million by weight of the total solution. Precipitation is inhibited.

EXAMPLE 3

The procedure of Example 1 is repeated except that the additive is added in an amount equal to about 700 parts per million by weight of the total solution. Precipitation is inhibited.

EXAMPLE 4

The procedure of Example 1 is repeated except that the additive is added in an amount equal to about 1200 parts per million by weight of the total solution and that the test is carried out for about twelve days. Precipitation is inhibited.

EXAMPLE 5

The procedure of Example 1 is repeated except that the additive is a telomer of acrylic acid and the sodium salt of 2-acrylamido-2-methylpropyl sulfonic acid in an amount equal to 280 parts per million by weight of the total solution. Precipitation is inhibited.

EXAMPLE 6

The procedure of Example 1 is repeated except additive is a terpolymer of acrylic acid, the sodium salt of 2-acrylamido-2-methylpropyl sulfonic acid, and the sodium salt of 4-styrenesulfonic acid in an amount equal to about 250 parts per million by weight of the total solution. Precipitation is inhibited.

EXAMPLE 7

The procedure of Example 1 is repeated except that the additive is a copolymer of acrylic acid and hydroxy propyl acrylate in an amount equal to about 200 parts per million by weight of the total solution. Precipitation is inhibited.

EXAMPLE 8

The procedure of Example 1 is repeated except the hard water is replaced with tap water and the amount of polymeric additive is about 55 parts per million by weight of the total solution. The tap water has a calcium and magnesium ion concentrations of 18.5 and 7.2 parts per million, respectively. Precipitation is inhibited.

From the examples, it can be seen that a small but effective amount of several polymeric additives inhibits the precipitation of salts from glycol-based compositions which have been mixed with water.

What is claimed is:

1. A glycol-based composition comprising:
   (A) 50 to 99 percent by weight of one or more glycols selected from the group consisting of alkylene glycols, alkylene glycol monoethers, and alkylene glycol diethers;
   (B) 0.001 to 15 percent by weight of one or more corrosion inhibitors:
   (C) 25 to 2500 parts of a polymeric additive per million parts by weight of the one or more glycols, the polymeric additive being essentially free of cross-linking and being a copolymer or a terpolymer of acrylic acid or alkali metal salt thereof and one or more of the monomers selected from the group consisting of 2-acrylamido-2-methylpropyl sulfonic, acid or alkali metal salt thereof, 4-styrenesulfonic acid or alkali metal salt thereof, a lower alkyl hydroxy acrylate, and mixtures thereof: and
   (D) up to 50 percent by weight water.

2. The composition of claim 1 wherein the composition has a pH of between about 8.0 and 10.

3. The composition of claim 1 wherein the polymeric additive is a copolymer of acrylic acid or alkali metal salt thereof and 2-acrylamido-2-methylpropyl sulfonic acid or metal salt thereof.

4. The composition of claim 3 wherein the copolymer has a weight ratio of acrylic acid or alkali metal salt thereof to 2-acrylamido-2-methylpropyl sulfonic acid or alkali metal salt thereof of between 25:75 and 95:5.

5. The composition of claim 1 wherein the polymeric additive is a copolymer of acrylic acid and a lower alkyl hydroxy acrylate.

6. The composition of claim 5 wherein the lower alkyl hydroxy acrylate is 2-hydroxy-propylacrylate.

7. The composition of claim 1 wherein the polymeric additive is a terpolymer of acrylic acid or alkali metal salt thereof, 2-acrylamido-2-methylpropyl sulfonic acid or alkali metal salt thereof, and 4-styrenesulfonic acid or alkali metal salt thereof.

8. The composition of claim 1 wherein the composition comprises between about 325 to 1500 parts of the polymeric additive per million parts by weight of the one or more glycols.

9. A method for preparing a glycol-based composition which comprises admixing a glycol-based composition with water to form a mixture containing between about 15 and 85 percent by weight water, the glycol-based composition comprising: (A) 50 to 99 percent by weight of one or more glycols selected from the group consisting of alkylene glycols, alkylene glycol monoethers, and alkylene glycol diethers; (B) 0.001 to 15 percent by weight of one or more corrosion inhibitors; (C) 25 to 2500 parts of a polymeric additive per million parts by weight of the one or more glycols, the polymeric additive being essentially free of cross-linking and being a copolymer or a terpolymer of acrylic acid or alkali metal salt thereof and one or more of the monomers selected from the group consisting of 2-acrylamido-2-methylpropyl sulfonic acid or metal salt thereof, 4-styrenesulfonic acid or metal salt thereof, a lower alkyl hydroxy acrylate, and mixtures thereof; and (D) up to 50 percent by weight of water.

10. The method of claim 9 wherein the glycol-based composition has a pH of between about 8.0 and 10.

11. The method of claim 9 wherein the polymeric additive is a copolymer of acrylic acid or alkali metal salt thereof and 2-acrylamido-2-methylpropyl sulfonic acid or metal salt thereof.

12. The composition of claim 11 wherein the copolymer has a weight ratio of acrylic acid or alkali metal salt thereof and 2-acrylamido-2-methylpropyl sulfonic acid or alkali metal salt thereof of between 25:75 and 95:5.

13. The method of claim 9 wherein the polymeric additive is a copolymer of acrylic acid and a lower alkyl hydroxy acrylate.

14. The method of claim 13 wherein the lower alkyl hydroxy acrylate is 2-hydroxy-propyl-acrylate.

15. The method of claim 9 wherein the polymeric additive is a terpolymer of acrylic acid or alkali metal salt thereof, 2-acrylamido-2-methylpropyl sulfonic acid or alkali metal salt thereof, and styrenesulfonic acid or alkali metal salt thereof.

16. The method of claim 9 wherein the composition comprises between about 325 to 1500 parts of the polymeric additive per million parts by weight of the one or more glycols.

17. A method for inhibiting the precipitation of salts in glycol-based compositions when contacted with water which comprises adding about 25 to 2500 parts of a polymeric additive per million parts by weight of glycol prior to contacting the glycol-based composition including 0.001 to 15 percent by weight of one or more corrosion inhibitors with water, the polymeric additive being essentially free of cross-linking and being a copolymer or a terpolymer of acrylic acid or alkali metal salt thereof and one or more of the monomers selected from the group consisting of 2-acrylamido-2-methylpropyl sulfonic acid or metal salt thereof, 4-styrenesulfonic acid or metal salt thereof, a lower alkyl hydroxy acrylate, and mixtures thereof.

18. The method of claim 17 wherein the glycol-based composition has a pH of between about 8.0 and 10.

19. The method of claim 17 wherein the polymeric additive is a copolymer of acrylic acid or alkali metal salt thereof and 2-acrylamido-2-methylpropyl sulfonic acid or metal salt thereof.

20. The composition of claim 19 wherein the copolymer has a weight ratio of acrylic acid or alkali metal salt thereof to 2-acrylamido-2-methylpropyl sulfonic acid or alkali metal salt thereof of between 25:75 and 95:5.

21. The method of claim 17 wherein the polymeric additive is a copolymer of acrylic acid and a lower alkyl hydroxy acrylate.

22. The method of claim 21 wherein the lower alkyl hydroxy acrylate is 2-hydroxy-propyl-acrylate.

23. The method of claim 17 wherein the polymeric additive is a terpolymer of acrylic acid or alkali metal salt thereof, 2-acrylamido-2-methylpropyl sulfonic acid or alkali metal salt thereof, and 4-styrenesulfonic acid or alkali metal salt thereof.

24. The method of claim 17 wherein the composition comprises between about 325 to 1500 parts of the polymeric additive per million parts by weight of the one or more glycols.

* * * * *